Jan. 31, 1950 C. L. RICHARDS ET AL 2,496,177

FREQUENCY DETERMINING CIRCUITS

Filed July 30, 1947

INVENTORS
CLAUDE LANGDON RICHARDS &
EDWARD JAMES GLAISHER
BY Fred W. Vogel
AGENT Patented Jan. 31, 1950 2,496,177

UNITED STATES PATENT OFFICE 2,496,177

FREQUENCY DETERMINING CIRCUITS

Claude Langdon Richards and Edward James Glaisher, London, England, assignors to The Hartford National Bank and Trust Company, Hartford, Conn., as trustee Application July 30, 1947, Serial No. 764,885
In Great Britain February 1, 1945

Section 1, Public Law 690, August 8, 1946
Patent expires February 1, 1965

4 Claims. (Cl. 250—40)

This invention relates to frequency determining circuits, and particularly to means for adjusting the value of inductance (L) and/or capacity (C) so that resonance occurs substantially at a required frequency. For communication apparatus it is often necessary to be able to adjust the LC product accurately to a required value within a close tolerance, which according to requirements may range from 1% to 0.001%.

Various methods have been proposed from time to time by which an electrical oscillation can be controlled so that its frequency differs from a required frequency only by a tolerable error. The present invention is based on the known circuit arrangement comprising a number of inductances and condensers together forming a resonant circuit having only one resonant frequency and which is tunable over a band of frequencies $F_t$—$F_o$, this band of frequencies being divided into $m$ major sub-bands of substantially equal width and each major sub-band being divided into $n$ substantially equal minor increments $\Delta F$, switching means being provided whereby the minor elements corresponding to any desired multiple of $\Delta F$ up to $n\Delta F$ can be selected while at the same time selecting any one of the major elements corresponding to the $m$ major bands.

According to the present invention, in such a circuit arrangement comprising major sub-bands and incremental minor elements, the incremental minor elements are chosen to give exactly equal frequency increments $\Delta F$ when associated with one particular major element, whereas each of the remaining major elements is so adjusted that at two frequencies lying within the frequency band corresponding to that major, the frequency increment is an exact multiple of $\Delta F$. Preferably the switching means for the major elements are separate from the switching means for the minor elements.

Certain embodiments of the invention will now be outlined with reference to the accompanying drawings in which—

Figure 1:
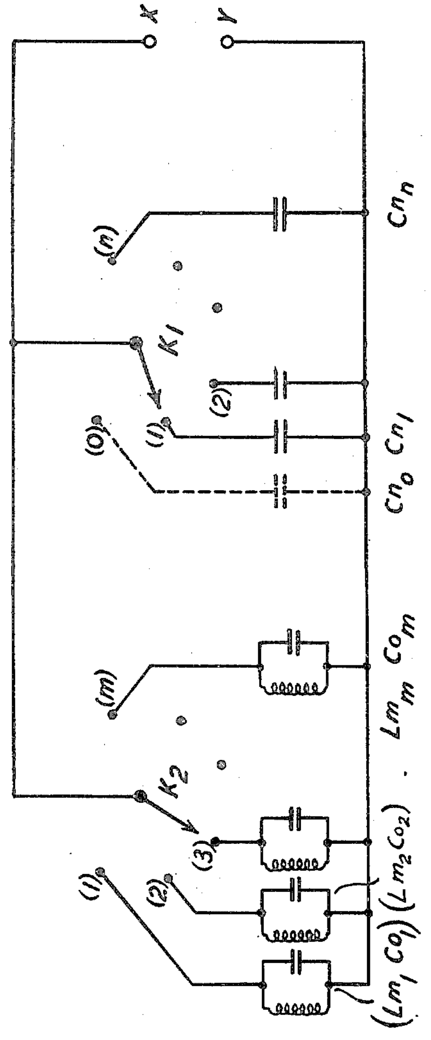
Fig. 1 shows a circuit arrangement in which the major elements are constituted by parallel LC combinations and the minor elements by condensers adapted to be connected in parallel with the major elements.

The circuit arrangement of Figure 1, operates as a variable LC combination so constituted that the resulting resonant frequency can be adjusted by substantially constant increments $\Delta F$, over a wide range of frequencies.

The system contains two switches, $K_1$ and $K_2$, where $K_1$ denotes the minor interval switch which has a zero position (0) in which the effective capacity connected across the terminals XY is $Cn_0$ and further $n$ positions giving $n$ minor intervals, the condensers $Cn_1 \ldots Cn_n$ being connected across the terminals XY in the successive positions of the switch $K_1$. $K_2$ is the major interval switch and has $m$ positions and connects across the terminals XY, in each position one of the parallel coil and condenser combinations $(Lm_1Co_1)$, $(Lm_2Co_2)$, $(Lm_mCo_m)$.

The impedance to the left of the terminals XY, therefore appears as a parallel LC combination whose magnitude depends upon the position of the switches $K_1$ and $K_2$.

If it is desired to cover a certain frequency range $F_o$ to $F_t$ in substantially constant increments of frequency $\Delta F$, and if exact increments are to be obtained for the major interval with the switch $K_2$ in position 1, values are assigned to the circuit elements $(Lm_1Co_1)$ $(Lm_2Co_2)$ etc., and to $Cn_0$, $Cn_1$ etc. in accordance with the following reasoning:

$$F_t = F_o + m.n.\Delta F.$$

With $K_2$ in position 1, and $K_1$ in position 0, $Lm_1$, $Co_1$, and $Cn_0$ are chosen so that $$F_o = \frac{1}{2\pi\sqrt{Lm_1(Co_1+Cn_0)}}$$

Then the remaining minor condensers $Cn_1$, $Cn_2$, etc. may be assigned values such that on moving switch $K_1$ from position 0 to 1 and from 1 to 2 and so on, the frequency increment is always $\Delta F$.

i. e.

$$F_0+\Delta F = \frac{1}{2\pi\sqrt{Lm_1(Co_1+Cn_1)}}$$

$$F_0+2\Delta F = \frac{1}{2\pi\sqrt{Lm_1(Co_1+Cn_2)}}$$

$$F_0+n\Delta F = \frac{1}{2\pi\sqrt{Lm_1(Co_1+Cn_n)}}$$

Consequently, as the switch $K_1$ is moved, each step adds a frequency increment $\Delta F$, and the maximum total increment is $n\Delta F$, and the complete traverse of the minor interval switch $K_1$ results in a frequency $Fo+n\Delta F$. This may be considered one major interval.

The major interval switch $K_2$ is now moved to position 2 and the minor interval switch back to position 0.

In the new position of switch $K_2$, new values may be assigned to the new major elements $Lm$ and $Co$, namely $Lm_2$ and $Co_2$.

By appropriate selection of $Lm_2$ and $Co_2$ the frequency deviation from $F_0$ in two positions of the minor interval switch $K_1$ is made an exact multiple of $\Delta F$. In the remaining positions of the switch $K_1$, the frequency intervals as determined by the combinations $Lm_2\ (Co_2+Cn)$ will not be exactly multiples of $\Delta F$.

In the same manner, two points may be set up for exact frequency increment on each major interval position of $K_2$.

Instead of obtaining exactly equal frequency increments $\Delta F$ in the first major interval corresponding to the major position 1 of the switch $K_2$, the maximum resulting errors may be reduced by tracking to exact frequency at a suitably chosen intermediate major position, and in the remaining major positions to track to exact frequency at intermediate minor points on the ranges.

For the sake of simplicity the explanation of the incremental tuning system of Figure 1 has been given with the minor elements consisting of condensers and the majors parallel coil and condenser combinations.

Figure 2:
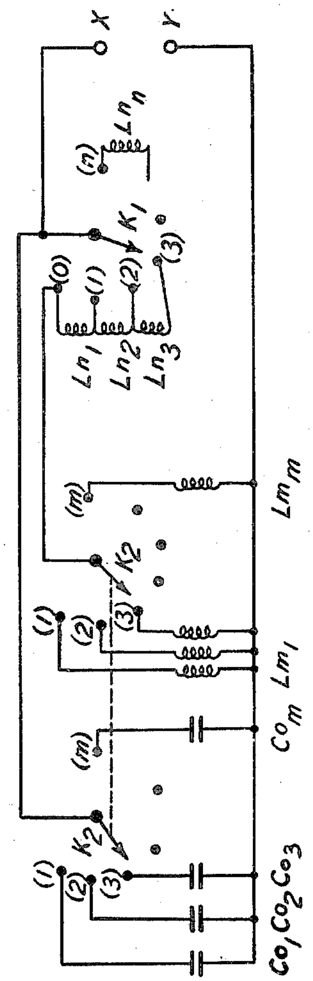
Fig. 2 shows a modified circuit arrangement in which the minor elements are constituted by inductances.

It is not the intention to limit the invention in this way, and Figure 2 shows an alternative arrangement for which similar reasoning may be developed and which results in a similar degree of frequency accuracy. In this arrangement the minor switch $K_1$ selects incremental inductances $Ln_1 \ldots Ln_n$, which are inserted by the major switch $K_2$ in series with suitable inductances, $(Lm)_1 \ldots (Lm)_m$ and the combinations tuned by parallel capacities $(Co)_1 \ldots (Co)_m$.

Still further combinations may be suggested; for example the minor elements may be condensers arranged to be inserted by the major interval switch in series with each major condenser in turn, which in conjunction with a parallel inductance forms each major unit.

Again, the minor elements may be composed of inductances arranged to be placed in parallel with the major elements.

The choice of type of element may be determined by other considerations of the design or manufacture of the apparatus.

Both the systems illustrated by Figures 1 and 2, are characterized by the condition that if there are $m$ majors and $n$ minors, then for one complete major, the incremental minor reactances are adjusted to give constant frequency increments, and further that each of the remaining $(m-1)$ majors has two points where the total incremental frequency is an exact multiple of $\Delta F$.

By appropriate choice of values for $m$ and $n$ in respect of the requirements for $\Delta F$, $F_0$ and $F_t$, it is possible to reduce the magnitude of the frequency error, defined as the amount by which the frequency at any setting of the switches $K_1$ and $K_2$ deviates from the correct multiple of $\Delta F$, to a value consistent with the usual errors commonly encountered.

For example, for $$F_0=2 \text{ mc./s.}, \Delta F=5 \text{ kc./3}$$
$$F_t=4 \text{ mc./s.}$$

and $m=n=20$, the error does not exceed 0.5 kc. at any setting.

We claim:

1. A resonant circuit arrangement comprising a plurality of tuned oscillatory circuits each having a given resonant frequency, said resonant frequencies consecutively interspersed by a substantially equal band of frequencies, a pair of terminals, first switching means to connect the said plurality of tuned oscillatory circuits to the said terminals selectively, a plurality of impedance elements, second switching means to couple the said impedance elements selectively to the said tuned oscillatory circuits, said impedance elements having values at which the resonant frequency of one of the said tuned oscillatory circuits is varied in steps, said steps having a given frequency bandwidth, and the remaining tuned oscillatory circuits having values at which each of said remaining tuned oscillatory circuits coupled to the said impedance elements have step variation of the same frequency bandwidth as the first said tuned oscillatory circuit at two of the step positions.

2. A resonant circuit arrangement comprising a plurality of tuned oscillatory circuits each with a given resonant frequency and having inductive and capacitive elements in parallel, the resonant frequencies of the said tuned oscillatory circuits consecutively interspersed by a substantially equal band of frequencies, a pair of terminals, first switching means to connect the said plurality of tuned oscillatory circuits to the said terminals selectively, a plurality of capacitive impedance elements, second switching means to couple the said capacitive impedance elements selectively to the said tuned oscillatory circuits, said capacitive impedance elements having values at which the resonant frequency of one of the said tuned oscillatory circuits is varied in steps, said steps having a given frequency bandwidth, and the remaining tuned oscillatory circuits having values at which each of said remaining tuned oscillatory circuits coupled to the said capacitive impedance elements have step variation of the same frequency bandwidth as the first said tuned oscillatory circuit at two of the step positions.

3. A resonant circuit arrangement comprising a plurality of tuned oscillatory circuits each with a given resonant frequency and having inductive and capacitive elements in parallel, the resonant frequencies of the said tuned oscillatory circuits consecutively interspersed by a substantially equal band of frequencies, a pair of terminals, first switching means to connect the said plurality of tuned oscillatory circuits to the said terminals selectively, a plurality of inductive impedance elements, second switching means to couple the said inductive impedance elements selectively to the said tuned oscillatory circuits, said inductive impedance elements having values at which the resonant frequency of one of the said tuned oscillatory circuits is varied in steps, said steps having a given frequency bandwidth, and the remaining tuned oscillatory circuits having values at which each of said remaining tuned oscillatory circuits coupled to the said inductive impedance elements have step variation of the same frequency bandwidth as the first said tuned oscillatory circuit at two of the step positions.

4. A resonant circuit arrangement comprising a plurality of inductive elements, a plurality of capacitive elements, first switching means to connect the said pluralities of inductive and capacitive elements to form tuned oscillatory circuits, each with a given resonant frequency, said resonant frequencies consecutively interspersed by a substantially equal band of frequencies, a plurality of impedance elements, second switching means to couple the said impedance elements selectively in series with the said tuned oscillatory circuits, said impedance elements having values at which the resonant frequency of one of the said tuned oscillatory circuits is varied in steps, said steps having a given frequency bandwidth, and the remaining tuned oscillatory circuits having values at which each of said remaining tuned oscillatory circuits coupled to the said impedance element have step variation of the same frequency bandwidth as the first said tuned oscillatory circuit at two of the step positions.

CLAUDE LANGDON RICHARDS.
EDWARD JAMES GLAISHER.

REFERENCES CITED

The following references are of record in the file of this patent:

UNITED STATES PATENTS

| Number | Name | Date |
|---|---|---|
| 2,215,775 | Banfield | Sept. 24, 1940 |